United States Patent
Matsumoto

(10) Patent No.: US 7,616,870 B2
(45) Date of Patent: Nov. 10, 2009

(54) DISK DEVICE AND CONTROL METHOD THEREFOR

(75) Inventor: Shinsuke Matsumoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 786 days.

(21) Appl. No.: 11/364,555

(22) Filed: Mar. 1, 2006

(65) Prior Publication Data

US 2006/0198615 A1    Sep. 7, 2006

(30) Foreign Application Priority Data

Mar. 2, 2005    (JP) .......................... P2005-056885

(51) Int. Cl.
  *H04N 5/00*    (2006.01)
  *H04N 9/79*    (2006.01)
(52) U.S. Cl. ........................ 386/126; 386/45
(58) Field of Classification Search ................. 386/126, 386/125, 45, 46, 124, 113, 95, 40
See application file for complete search history.

(56) References Cited

U.S. PATENT DOCUMENTS 7,127,155 B2 * 10/2006 Ando et al. ................... 386/95

2003/0014690 A1 * 1/2003 Frimout ........................ 714/20
2005/0025468 A1    2/2005 Osaki

FOREIGN PATENT DOCUMENTS

| JP | 10-161938 | 6/1998 |
|---|---|---|
| JP | 2003-109360 | 4/2003 |
| JP | 2004-206742 | 7/2004 |
| JP | 2004-289694 | 10/2004 |

\* cited by examiner

*Primary Examiner*—Robert Chevalier
(74) *Attorney, Agent, or Firm*—Morgan, Lewis & Bockius LLP

(57) ABSTRACT

When the recording is started, recording information for information data is saved. When the supply of power has been recovered, the NWA and the LBN at the title head are reproduced based on the recording information. When RDI is present in a VOBU, and when a sequence code is not present in the VOBU, the reading of the first sector of the succeeding VOBU is repeated. When RDI is not present in a VOBU, or when a sequence code is present in the VOBU, the RTR_VMGI is created, the number of recorded titles that are saved is compared with the number of titles obtained when the supply of power has been recovered. Until there are no more following titles, reproduction of the LBNs at the title head is repeated. And when there are no more following titles, the RTR_VMGI is written to the optical disk.

5 Claims, 3 Drawing Sheets

DISK DEVICE AND CONTROL METHOD THEREFOR

BACKGROUND OF THE INVENTION

1. Field of the Invention

The present invention relates to a disk device for the recording of information data on, and the reproduction of information data from an optical disk, and a control method therefor, and relates particularly to a disk device that, even when a blackout occurs during the recording of information data on an optical disk, can record succeeding information data on the optical disk, and a control method therefor.

2. Description of the Related Art

Generally, when the supply of power to a disk device is cut off, due, for example, to a blackout that occurs during the recording of information data in a VR (Video Recording) mode, the recording of information data on the optical disk is forcibly terminated, instead of the normal recording end processing being performed for the optical disk. In such a case, when the supply of power to the disk device has been recovered, control information to be recorded as part of the end process for the optical disk, i.e., RTR_VMGI (Real Time Recording_Video Management Information), is not recorded on the optical disk, so that the next recording start address on the optical disk is not specified, and subsequently, information data can not be recorded on the optical disk. Further, even if the recording of the control information RTR_VMGI on the optical disk is designated each time a title for information data is recorded, when the supply of power to the disk device is cut off, due, for example, to a blackout, before the control information RTR_VMGI has been recorded on the optical disk, the recording of the control information RTR_VMGI can not be accomplished. Thus, when the supply of power to the disk device has been recovered, the control information RTR_VMGI is not available on the optical disk, the next recording start position for the optical disk can not be specified, and the additionally available information data can not be recorded on the optical disk. Furthermore, in order to store the control information RTR_VMGI in a flash memory during the recording of information data on the optical disk, a large memory capacity is required for the flash memory.

There is a conventional example wherein, after power has been turned on, a discontinuous point along a time axis is detected by scanning index data, and wherein, based on index data for the detected discontinuous point, and in accordance with a location in a file corresponding to the discontinuous point, a recording start point is designated and the recording of information data is restarted (see, for example, JP-A-2004-289694).

SUMMARY OF THE INVENTION

According to the conventional example, after power has been turned on, the discontinuous point along the time axis is detected by scanning index data, and based on the index data for the detected discontinuous point, and in accordance with the location in a file corresponding to the discontinuous point, a recording start position is designated to enable the restarting of the recording of information data. Specifically, according to this technique, information data are cyclically recorded in a temporary recording file on a hard disk. In a case wherein recording is interrupted, for example, by a blackout, after the power has later been turned on, a discontinuous point along the time axis is detected by scanning index data, and the recording of information data is re started, beginning at the location corresponding to the discontinuous point. However, the above described problems are not resolved.

While taking the shortcomings into account, the objective of the present invention is to provide a disk device that, in a case wherein, during the recording of information data on an optical disk in a VR mode, the supply of power to the disk device is cut off, due, for example, to a blackout, all the titles of information data recorded on the optical disk can be recovered when the supply of power to the disk device has been recovered, and information data following that previously recorded can be then be recorded on the optical disk.

To achieve this objective, according to this invention, a disk device, for performing the recording and reproduction of information data relative to an optical disk in a VR mode, includes: a storage unit, for storing, when recording of information data is initiated, recording information for information data that are to be recorded on the optical disk, and for, during the recording of the information data, storing as MNFI_DT (Manufacture Information_Data) for an RDI (Real-time Data Information) pack, recording information for the information data that are currently recorded on the optical disk; a first reproduction unit, for reading, when the supply of power to the disk device has been recovered, recording information for the information data stored on the storage unit, and for reproducing an NWA (Next Writable Address); a second reproduction unit, for reading the recording information for the information data stored in the storage unit, and for reproducing an LBN (Logical Block Number) at the head of the title of the information data; a first determination unit, for reading a first sector of a VOBU (Video Object Unit) from the optical disk, and determining whether there is RDI in the first sector of the VOBU; a second determination unit, for reading, when the first determination unit determines that RDI is present in the first sector of the VOBU, a last sector of the VOBU from the optical disk and determining whether there is a sequence code in the last sector of the VOBU; a first repetition unit, for reading, when the second determination unit determines that a sequence code is not present in the last sector of the VOBU, the recording information for the information data in the MNFI_DI of the RDI pack stored in the storage unit, and for calculating an LBN for the next VOBU, and for repeating an operation beginning with the reading of a first sector of the next VOBU from the optical disk; a creation unit, for creating RTR_VMGI when the first determination determines that RDI is not present in the first sector of the VOBU, or when the second determination unit determines that a sequence code is present in the last sector of the VOBU; a third determination unit, for comparing, when the supply of power has been recovered, the number of recorded titles, for recorded information related to information data that are stored in the storage unit, with the number of titles for information data, and for determining whether, for information data, a next title is recorded on the optical disk; a second repetition unit, for repeating, when the third determination unit determines that there is a next title for the information data recorded on the optical disk, an operation beginning with the reproduction of the LBN at the head of the next title for the information data; and a writing unit, for writing, when the third determination unit determines that a next title for information data is not present, to the optical disk RTR_VMGI that is created by the creation unit.

When the recording of information data is begun, the storage unit may store, as recording information, the format of information data to be recorded on the optical disk, an NWA, LBNs at the title head that are equivalent in number to the recorded titles, and the number of recorded titles. And during the recording of information data, the storage unit may store, in the MNFI_DT for an RDI pack, recording information for a VOBU_ENT (Video Object Unit_Entry) of the current VOBU for information data that are currently recorded on the optical disk, the VOBU_ENT for the next VOBU, the Video attribute of the current title, the Audio attribute of the current title, M_VOB_STI_NS (Movie_Video Object_Stream Information_Next Sector), M_VOBI_SRP_NS (Movie_Video Object Information_Search Pointer_Next Sector) and M_VOB_STIN (Movie_Video Object_Stream Information Number) of the current title.

The storage unit may be a rewritable nonvolatile memory wherein the saving of recording information for information data is enabled when the supply of power to the disk device is cut off.

In a case wherein, during the recording of information data on an optical disk in the VR mode, the supply of power to the disk device is cut off, for example, by a blackout, using the above described means, all the titles of information data that were recorded on the optical disk can be reproduced when the supply of power to the disk device has been recovered, and the immediately following information data can be recorded on the optical disk.

According to a disk device of a first aspect of the invention, for performing the recording and reproduction of information data relative to an optical disk in a VR mode, when recording of information data is initiated, the format of information data to be recorded on the optical disk, an NWA, LBNs at the title head that are equivalent in number to the recorded titles and the number of recorded titles are stored in a flash memory. And during the recording of the information data, a VOBU_ENT (Video Object Unit_Entry) of the current VOBU for information data that are currently recorded on the optical disk, the VOBU_ENT for the next VOBU, the Video attribute of the current title, the Audio attribute of the current title, M_VOB_STI_NS (Movie_Video Object_Stream Information_Next Sector), M_VOBI_SRP_NS (Movie_Video Object Information_Search Pointer_Next Sector) and M_VOB_STIN (Movie_Video Object_Stream Information Number) of the current title are stored as MNFI_DT (Manufacture Information_Data) for an RDI (Real-time Data Information) pack in the flash memory. When the supply of power to the disk device has been recovered, recording information for the information data stored in the flash memory is read, and an NWA (Next Writable Address) is reproduced. The recording information for the information data stored in the flash memory is read, and an LBN (Logical Block Number) at the head of the title of the information data is reproduced. A first sector of a VOBU (Video Object Unit) is read from the optical disk to determine whether there is RDI in the first sector of the VOBU. When RDI is present in the first sector of the VOBU, a last sector of the VOBU is read from the optical disk to determine whether there is a sequence code in the last sector of the VOBU. When a sequence code is not present in the last sector of the VOBU, the recording information for the information data in the MNFI_DI of the RDI pack is read from the flash memory, an LBN for the next VOBU is calculated, and an operation beginning with the reading of a first sector of the next VOBU from the optical disk is repeated. RTR_VMGI is created when RDI is not present in the first sector of the VOBU, or when a sequence code is present in the last sector of the VOBU. When the supply of power has been recovered, the number of recorded titles, for recorded information related to information data that are stored in the flash memory, is compared with the number of titles for information data, to determine whether, for information data, a next title is recorded on the optical disk. When there is a next title for the information data recorded on the optical disk, an operation beginning with the reproduction of the LBN at the head of the next title for the information data is repeated. When a next title for information data is not present, RTR_VMGI that is created is written to the optical disk. Therefore, in a case wherein, during the recording of information data on an optical disk in the VR mode, the supply of power to the disk device is cut off, for example, by a blackout, all the titles of information data that were recorded on the optical disk can be reproduced when the supply of power to the disk device has been recovered, and the immediately following information data can be recorded on the optical disk.

According to a disk device according to a second aspect of the invention, for performing the recording and reproduction of information data relative to an optical disk in a VR mode, when recording of information data is initiated, recording information of information data to be recorded on the optical disk is stored in a flash memory. And during the recording of the information data, the recording information for the information data that are currently recorded on the optical disk is stored as MNFI_DT for an RDI pack. When the supply of power to the disk device has been recovered, recording information for the information data is read, and an NWA is reproduced. The recording information for the information data is read, and an LBN at the head of the title of the information data is reproduced. A first sector of a VOBU is read from the optical disk to determine whether there is RDI in the first sector of the VOBU. When RDI is present in the first sector of the VOBU, a last sector of the VOBU is read from the optical disk to determine whether there is a sequence code in the last sector of the VOBU. When a sequence code is not present in the last sector of the VOBU, the recording information for the information data in the MNFI_DI of the RDI pack that is stored is read, an LBN for the next VOBU is calculated, and an operation beginning with the reading of a first sector of the next VOBU from the optical disk is repeated. RTR_VMGI is created when RDI is not present in the first sector of the VOBU, or when a sequence code is present in the last sector of the VOBU. When the supply of power has been recovered, the number of recorded titles, for recorded information related to information data that are stored in the storage unit, is compared with the number of titles for information data, to determine whether, for information data, a next title is recorded on the optical disk. When there is a next title for the information data recorded on the optical disk, an operation beginning with the reproduction of the LBN at the head of the next title for the information data is repeated. When a next title for information data is not present, RTR_VMGI that is created is written to the optical disk. Therefore, in a case wherein, during the recording of information data on an optical disk in the VR mode, the supply of power to the disk device is cut off, for example, by a blackout, all the titles of information data that were recorded on the optical disk can be reproduced when the supply of power to the disk device has been recovered, and the immediately following information data can be recorded on the optical disk.

According to a disk device of a third aspect of the invention, when the recording of information data is begun, the storage unit stores, as recording information, the format of information data to be recorded on the optical disk, an NWA, LBNs at the title head that are equivalent in number to the recorded titles, and the number of recorded titles. And during the recording of information data, the storage unit stores, in the MNFI_DT for an RDI pack, recording information for a VOBU_ENT of the current VOBU for information data that are currently recorded on the optical disk, the VOBU_ENT for the next VOBU, the Video attribute of the current title, the Audio attribute of the current title, M_VOB_STI_NS, M_VOBI_SRP_NS and M_VOB_STIN of the current title. Therefore, an amount of information data currently recorded on the optical disk is small, and information data currently recorded on the optical disk can be saved in a memory having a small capacity.

According to a disk device of a fourth aspect of the invention, during recording of information data is started, recording information of information data to be recorded to the optical disk is stored in a rewritable nonvolatile memory, and during recording of information data, recording information for information data currently recorded on the optical disk is stored in MNFI_DT of an RDI pack of a rewritable nonvolatile memory. Thus, when the supply of power to the disk device is cut off due to, for example, a blackout, both recording information for information data to be recorded to the optical disk and recording information for information data currently recorded to the optical disk can be saved.

According to a control method for a disk device of a fifth aspect of the invention, when recording of information data is initiated, the format of information data to be recorded on the optical disk, an NWA, LBNs at the title head that are equivalent in number to the recorded titles and the number of recorded titles are stored in a flash memory. And during the recording of the information data, a VOBU_ENT of the current VOBU for information data that are currently recorded on the optical disk, the VOBU_ENT for the next VOBU, the Video attribute of the current title, the Audio attribute of the current title, M_VOB_STI_NS, M_VOBI_SRP_NS and M_VOB_STIN of the current title are stored as MNFI_DT for an RDI pack in the flash memory. When the supply of power to the disk device has been recovered, recording information for the information data stored in the flash memory is read, and an NWA is reproduced. The recording information for the information data stored in the flash memory is read, and an LBN at the head of the title of the information data is reproduced. A first sector of a VOBU is read from the optical disk to determine whether there is RDI in the first sector of the VOBU. When RDI is present in the first sector of the VOBU, a last sector of the VOBU is read from the optical disk to determine whether there is a sequence code in the last sector of the VOBU. When a sequence code is not present in the last sector of the VOBU, the recording information for the information data in the MNFI_DI of the RDI pack is read from the flash memory, an LBN for the next VOBU is calculated, and an operation beginning with the reading of a first sector of the next VOBU from the optical disk is repeated. RTR_VMGI is created when RDI is not present in the first sector of the VOBU, or when a sequence code is present in the last sector of the VOBU. When the supply of power has been recovered, the number of recorded titles, for recorded information related to information data that are stored in the flash memory, is compared with the number of titles for information data, to determine whether, for information data, a next title is recorded on the optical disk. When there is a next title for the information data recorded on the optical disk, an operation beginning with the reproduction of the LBN at the head of the next title for the information data is repeated. When a next title for information data is not present, RTR_VMGI that is created is written to the optical disk. Therefore, in a case wherein, during the recording of information data on an optical disk in the VR mode, the supply of power to the disk device is cut off, for example, by a blackout, all the titles of information data that were recorded on the optical disk can be reproduced when the supply of power to the disk device has been recovered, and the immediately following information data can be recorded on the optical disk.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Figure 1:
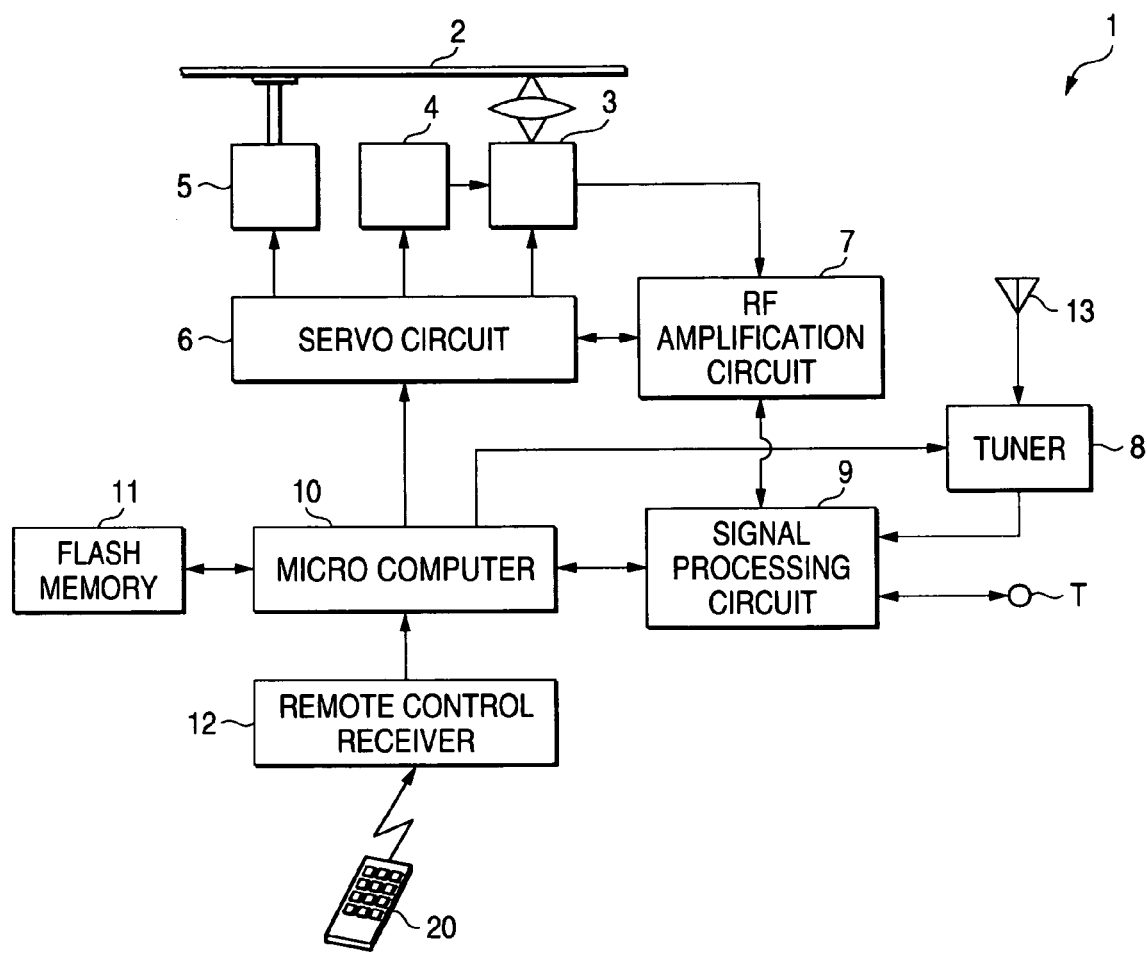
FIG. 1 is a block diagram showing the configuration of a disk device according to one embodiment of the present invention.
Figure 2:
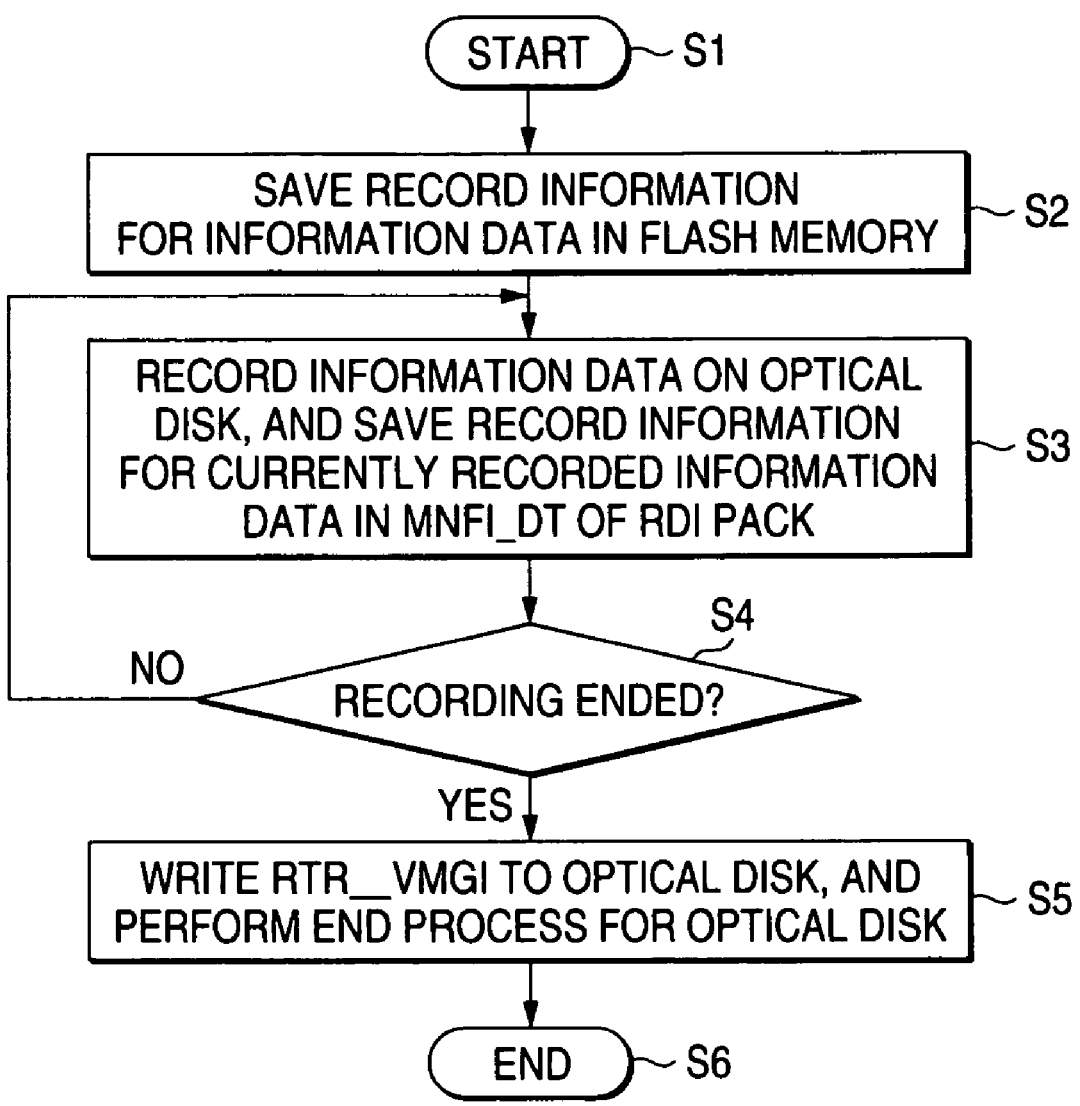
FIG. 2 is a flowchart showing the recording operation of the disk device according to the embodiment of the invention.
Figure 3:
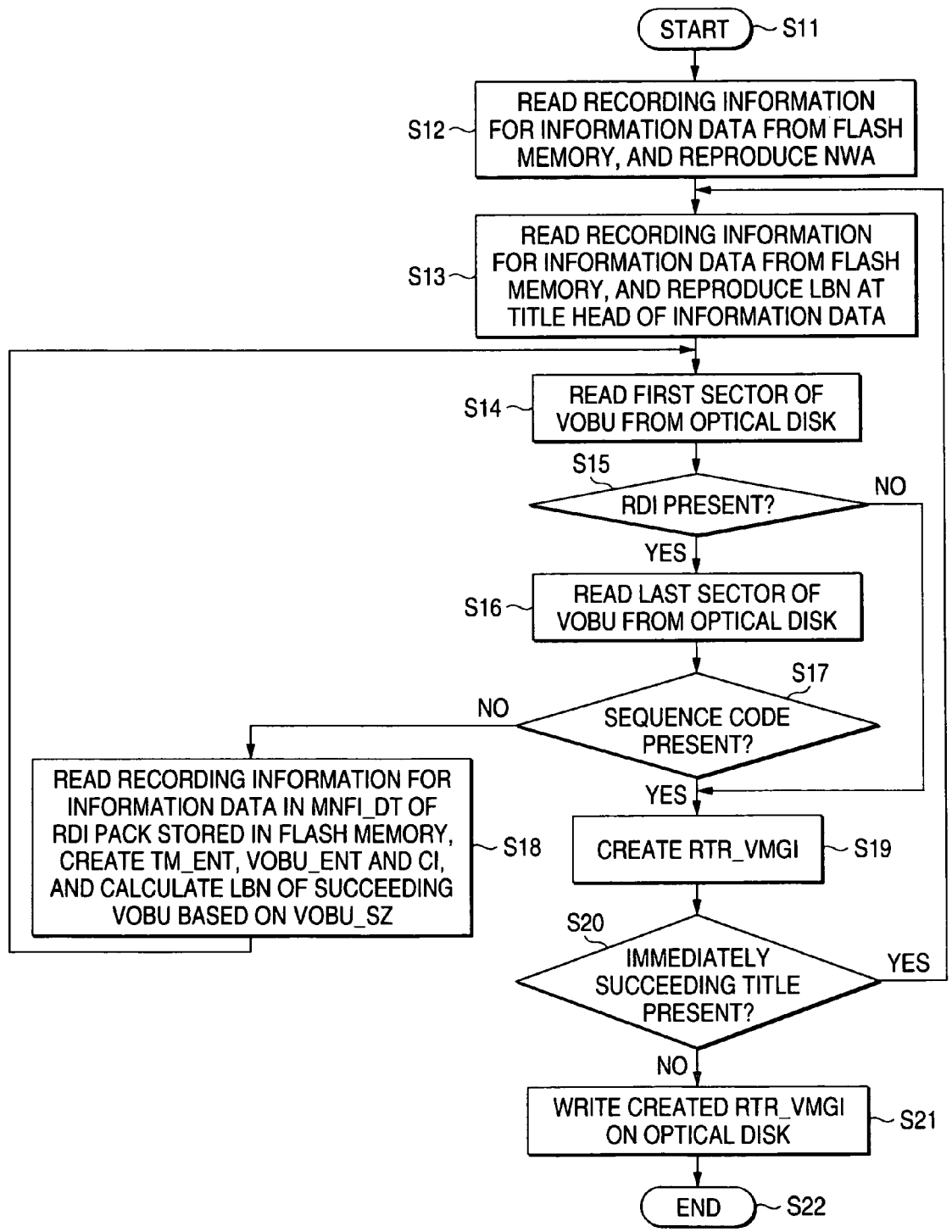
FIG. 3 is a flowchart showing the operation of the disk device according to the embodiment of the invention performed after the supply of power has been recovered.

The preferred embodiment of the present invention will now be described in detail while referring to the accompanying drawings. FIG. 1 is a block diagram showing the configuration of a disk device according to one embodiment of the present invention. FIG. 2 is a flow chart showing the recording operation performed by the disk device in accordance with the embodiment of the invention. FIG. 3 is a flowchart showing the operation of the disk device of this embodiment after the supply of power has been recovered.

First, the configuration of the disk device according to the embodiment of the invention will be described while referring to the block diagram in FIG. 1.

A disk device 1 includes: an optical pickup 3, for the emitting a laser beam to irradiate an optical disk 2 on which information data have been recorded, for detecting reflected light to read the information data recorded on the optical disk 2, and for emitting a laser beam to irradiate the optical disk 2 and to record information data on the optical disk 2; a thread motor 4, for performing the thread shifting of the optical pickup 3 in the radial direction of the optical disk 2; a spindle motor 5, for rotating the optical disk 2; a servo circuit 6, for providing servo control for the rotational direction, the rotational speed of the thread motor 4 and the rotational speed of the spindle motor 5, for employing a tracking error signal, detected by the optical pickup 3, to provide servo control for tracking the optical pickup 3, and for employing a focus error signal, detected by the optical pickup 3, to provide servo control for focusing the optical pickup 3; an RF amplification circuit 7, for amplifying an RF (Radio Frequency) signal for information data read by the optical pickup 3 and for amplifying an RF signal, for information data to be recorded on the optical disk 2; a tuner 8, for receiving a TV broadcast for a channel selected from among TV broadcasting waves received at an antenna 13; a signal processing circuit 9, for synchronously detecting and demodulating, based on a reference clock, information data read by the optical pickup 3, for correcting an error in the demodulated information data, for expanding information data that are compressed by a predetermined compression system, for decoding the expanded information data and reproducing information data, for encoding information data for a TV broadcast received from the tuner 8 and information data received from an external input terminal T, and for compressing the encoded information data based on a predetermined compression system; a micro computer 10, for controlling the entire system of the disk device 1; a flash memory 11, a rewritable nonvolatile memory, for storing record information for information data that are to be recorded on an optical disk when the recording of information data is started and for storing recording information for information data during the recording of these data on the optical disk; and a remote control receiver 12, for receiving an infrared remote control signal from a remote controller 20 and for converting this signal into a predetermined electric signal.

The operation of the disk device 1 having this arrangement will now be described.

When the recording of information data on the optical disk 2 in a VR mode is instructed by the manipulation of keys on the remote controller 20, the micro computer 10 begins the recording of the information data. Specifically, the micro computer 10 stores, in the flash memory 11, the recording format for information data to be recorded on the optical disk 2, an NWA, LBNs at the title head, equivalent in number to the recorded titles, and the number of recorded titles. Further, the micro computer 10 transmits a control signal to the servo circuit 6, which then drives the spindle motor 5 to rotate the optical disk 2, and drives the thread motor 4 to perform the thread shifting of the optical pickup 3 in the radial direction of the optical disk 2. Thus, the optical pickup 3 starts the recording of information data on the optical disk 2.

During the recording of the information data, the micro computer 10 stores, in the MNFI_DT of an RDI pack in the flash memory 11, recording information for a VOBU_ENT in the current VOBU, a VOBU_ENT for the next VOBU, the Video attribute for the current title, the Audio attribute of the current title, and a M_VOB_STI_NS, a M_VOBI_SRP_NS and a M_VOB_STIN for the current titles of the information data that are currently recorded on the optical disk 2.

When the recording end for information data is instructed by the manipulation of keys on the remote controller 20, control information RTR_VMGI is written to the optical disk 2, and the end process for the optical disk 2 is performed.

In a case wherein, during the recording of information data on the optical disk 2 in the VR mode, the supply of power to the disk device is cut off, due, for example, to a blackout, and when the supply of power to the disk device 1 has been recovered, the micro computer 10 reads record information for information data stored in the flash memory 11 and reproduces the NWA. Further, the micro computer 10 reads recording information for the information data stored in the flash memory 11 and reproduces the LBN at the title head of the information data. Then, the micro computer 10 reads the first sector of a VOBU from the optical disk 2, and determines whether RDI is present in the first sector of the VOBU read from the optical disk 2. When RDI is present in the first sector of the VOBU read from the optical disk, the micro computer 10 reads the last sector of the VOBU on the optical disk 2 and determines whether a sequence code is present in the last sector of the VOBU read from the optical disk 2.

When a sequence code is not present in the last sector of the VOBU read from the optical disk 2, the micro computer 10 reads record information for the information data in the MNFI_DT of the RDI pack that is stored in the flash memory 11, and creates a TM_ENT (Time_Entry), a VOBU_ENT (Video Object Unit_Entry) and CI (Cell Information), and calculates the LBN of the next VOBU based on VOBU_SZ (Video Object Unit_Size). Thereafter, the micro computer 10 repeats the operation beginning with the reading of the first sector of the next VOBU from the optical disk 2.

When RDI is not present in the first sector of the VOBU read from the optical disk 2, or when a sequence code is present in the last sector of the VOBU read from the optical disk 2, the micro computer 10 creates control information RTR_VMGI, reads record information for information data stored in the flash memory 11, compares the number of recorded titles included in the recording information for the information data with the number of titles for the information data obtained when the supply of power has been recovered, and determines whether there is an immediately succeeding title for information data recorded on the optical disk 2. When there is an immediately succeeding title for the information data recorded on the optical disk 2, the micro computer 10 repeats the operation beginning with the reproduction of the LBN for the head of the immediately succeeding title for the information data.

The reproduction of the LBN at the title head for information data is repeated, and when there are no further titles for information data recorded on the optical disk 2, the micro computer 10 writes the created control information RTR_VMGI on the optical disk 2, and records the following information on the optical disk 2.

The recording operation performed by the disk device 1 of the embodiment will now be described while referring to the flowchart in FIG. 2.

When the recording of information data in the VR mode to the optical disk 2 is instructed by the manipulation of keys on the remote controller 20, program control advances from step S1 to S2. At step S2, the recording of information data is started, and recording information, such as the recording format for information data to be recorded on the optical disk 2, the NWA, the LBNs at the title head, equivalent in number to the recorded titles, and the number of recorded titles, is stored in the flash memory 11. Program control then advances to step S3.

At step S3, the information data are recorded on the optical disk 2, and during this recording, record information, for the information data that are currently recorded on the optical disk 2, such as the VOBU_ENT for the current VOBU, the VOBU_ENT for the succeeding VOBU, the Video attribute of the current title, the Audio attribute for the current title, the M_VOB_STI_NS, the M_VOBI_SRP_NS and the M_VOB_STIN of the current title, is stored in the MNFI_DT of an RDI pack of the flash memory 11. Program control then advances to step S4.

At step S4, a check is performed to determine whether the end of recording of information data is instructed by the manipulation of keys on the remote controller 20. When the end of the recording of information data is instructed, program control advances to step S6. When the end of the recording of information data is not instructed, program control returns to step S3 and the processing beginning at step S3 is repeated.

At step S5, control information RTR_VMGI is written on the optical disk 2, and the end process for the optical disk 2 is performed. Program control thereafter advances to step S6, and the processing is terminated.

The operation of the disk device 1 for the embodiment of the invention after the supply of power has been recovered will now be described while referring to the flowchart in FIG. 3.

In a case wherein, during the recording of information data on the optical disk 2 in the VR mode, the supply of power to the disk device 1 is cut off, due, for example, to a blackout, when the supply of power to the disk device 1 has been recovered, program control advances from step S11 to step S12. At step S12, recording information for information data stored in the flash memory is read, and the NWA is reproduced. Program control then advances to step S13.

At step S13, recording information for the information data stored in the flash memory 11 is read, and the LBN at the title head of the information data is reproduced. Program control then advances to step S14.

At step S14, the first sector of a VOBU is read from the optical disk 2, and program control advances to step S15.

At step S15, a check is performed to determine whether RDI is present in the first sector of the VOBU read from the optical disk 2. When there is RDI in the first sector of the VOBU read from the optical disk 2, program control advances to step S16. When RDI is not present in the first sector of the VOBU read from the optical disk 2, program control is shifted to step S19.

At step S16, the last sector of the VOBU is read from the optical disk 2, and program control advances to step S17.

At step S17, a check is performed to determine whether a sequence code is present in the last sector of the VOBU read from the optical disk 2. When a sequence code is present in the last sector of the VOBU read from the optical disk 2, program control is advanced to step S19. When a sequence code is not present in the last sector of the VOBU read from the optical disk 2, program control is shifted to step S18.

At step S18, recording information for information data in the MNFI_DT of the RDI pack that is stored in the flash memory 11 is read out, the TM_ENT, the VOBU_ENT and the CI are created, and the LBN of the succeeding VOBU is calculated based on the VOBU_SZ. Program control thereafter returns to step S14, and the processing beginning at step S14 is repeated.

At step S19, the control information RTR_VMGI is prepared, and program control advances to step S20.

At step S20, the recording information for the information data stored in the flash memory 11 is read; the number of recorded titles, which is included in the record information for the information data, is compared with the number of titles included in the information data obtained when the supply of power has been recovered; and a check is performed to determine whether there is an immediately succeeding title for information data recorded on the optical disk 2. When there is an immediately succeeding title for information data recorded on the optical disk 2, program control returns to step S13, and the processing beginning at step S13 is repeated. When the immediately succeeding title for information data recorded on the optical disk 2 is not present, program control advances to step S21.

At step S21, control information RTR_VMGI created at step S19 is written on the optical disk 2. Thereafter, program control advances to step S22, and the processing is terminated.

The preferred embodiment of the invention has been explained in detail. However, the present invention is not limited to this embodiment, and can, of course, be variously modified and improved within the scope of the technical knowledge of one having ordinary skill in the art.

What is claimed is:

1. A disk device, for performing the recording and reproduction of information data relative to an optical disk in a VR mode, comprising:

a flash memory, for storing, when recording of information data is initiated, as recording information, the format of information data to be recorded on the optical disk, an NWA, LBNs at the title head that are equivalent in number to the recorded titles, and the number of recorded titles, and for, during the recording of the information data, storing as MNFI_DT for an RDI pack, recording information for a VOBU_ENT of the current VOBU for information data that are currently recorded on the optical disk, the VOBU_ENT for the next VOBU, the Video attribute of the current title, the Audio attribute of the current title, M_VOB_STI_NS, M_VOBI_SRP_NS and M_VOB_STIN of the current title;

a first reproduction unit, for reading, when the supply of power to the disk device has been recovered, recording information for the information data stored on the flash memory, and for reproducing an NWA;

a second reproduction unit, for reading the recording information for the information data stored in the flash memory, and for reproducing an LBN at the head of the title of the information data;

a first determination unit, for reading a first sector of a VOBU from the optical disk, and determining whether there is RDI in the first sector of the VOBU;

a second determination unit, for reading, when the first determination unit determines that RDI is present in the first sector of the VOBU, a last sector of the VOBU from the optical disk and determining whether there is a sequence code in the last sector of the VOBU;

a first repetition unit, for reading, when the second determination unit determines that a sequence code is not present in the last sector of the VOBU, the recording information for the information data in the MNFI_DI of the RDI pack stored in the flash memory, and for calculating an LBN for the next VOBU, and for repeating an operation beginning with the reading of a first sector of the next VOBU from the optical disk;

a creation unit, for creating RTR_VMGI when the first determination determines that RDI is not present in the first sector of the VOBU, or when the second determination unit determines that a sequence code is present in the last sector of the VOBU;

a third determination unit, for comparing, when the supply of power has been recovered, the number of recorded titles, for recorded information related to information data that are stored in the flash memory, with the number of titles for information data, and for determining whether, for information data, a next title is recorded on the optical disk;

a second repetition unit, for repeating, when the third determination unit determines that there is a next title for the information data recorded on the optical disk, an operation beginning with the reproduction of the LBN at the head of the next title for the information data; and a writing unit, for writing, when the third determination unit determines that a next title for information data is not present, to the optical disk RTR_VMGI that is created by the creation unit.

2. A disk device, for performing the recording and reproduction of information data relative to an optical disk in a VR mode, comprising:

a storage unit, for storing, when recording of information data is initiated, recording information for information data that are to be recorded on the optical disk, and for, during the recording of the information data, storing as MNFI_DT for an RDI pack, recording information for the information data that are currently recorded on the optical disk;

a first reproduction unit, for reading, when the supply of power to the disk device has been recovered, recording information for the information data stored on the storage unit, and for reproducing an NWA;

a second reproduction unit, for reading the recording information for the information data stored in the storage unit, and for reproducing an LBN at the head of the title of the information data;

a first determination unit, for reading a first sector of a VOBU from the optical disk, and determining whether there is RDI in the first sector of the VOBU;

a second determination unit, for reading, when the first determination unit determines that RDI is present in the first sector of the VOBU, a last sector of the VOBU from the optical disk and determining whether there is a sequence code in the last sector of the VOBU;

a first repetition unit, for reading, when the second determination unit determines that a sequence code is not present in the last sector of the VOBU, the recording information for the information data in the MNFI_DI of the RDI pack stored in the storage unit, and for calculating an LBN for the next VOBU, and for repeating an operation beginning with the reading of a first sector of the next VOBU from the optical disk;

a creation unit, for creating RTR_VMGI when the first determination determines that RDI is not present in the first sector of the VOBU, or when the second determination unit determines that a sequence code is present in the last sector of the VOBU;

a third determination unit, for comparing, when the supply of power has been recovered, the number of recorded titles, for recorded information related to information data that are stored in the storage unit, with the number of titles for information data, and for determining whether, for information data, a next title is recorded on the optical disk;

a second repetition unit, for repeating, when the third determination unit determines that there is a next title for the information data recorded on the optical disk, an operation beginning with the reproduction of the LBN at the head of the next title for the information data; and a writing unit, for writing, when the third determination unit determines that a next title for information data is not present, to the optical disk RTR_VMGI that is created by the creation unit.

3. The disk device according to claim 2, wherein when the recording of information data is begun, the storage unit stores, as recording information, the format of information data to be recorded on the optical disk, an NWA, LBNs at the title head that are equivalent in number to the recorded titles, and the number of recorded titles, and wherein, during the recording of information data, the storage unit stores, in the MNFI_DT for an RDI pack, recording information for a VOBU_ENT of the current VOBU for information data that are currently recorded on the optical disk, the VOBU_ENT for the next VOBU, the Video attribute of the current title, the Audio attribute of the current title, M_VOB_STI_NS, M_VOBI_SRP_NS and M_VOB_STIN of the current title.

4. The disk device according to claim 2, wherein the storage unit is a rewritable nonvolatile memory.

5. A control method for a disk device comprising:

when recording of information data is initiated, storing, in a flash memory, recording information for information data to be recorded on the optical disk, an NWA, LBNs at the title head that are equivalent in number to the recorded titles and the number of recorded titles;

during the recording of the information data, storing, as MNFI_DT for an RDI pack in the flash memory, a VOBU_ENT of the current VOBU for information data that are currently recorded on the optical disk, the VOBU_ENT for the next VOBU, the Video attribute of the current title, the Audio attribute of the current title, M_VOB_STI_NS, M_VOBI_SRP_NS and M_VOB_STIN of the current title;

when the supply of power to the disk device has been recovered, reading recording information for the information data stored in the flash memory, and reproducing an NWA;

reading the recording information for the information data stored in the flash memory, and reproducing an LBN at the head of the title of the information data;

reading a first sector of a VOBU from the optical disk, and determining whether there is RDI in the first sector of the VOBU;

when RDI is present in the first sector of the VOBU, reading a last sector of the VOBU from the optical disk, and determining whether there is a sequence code in the last sector of the VOBU;

when a sequence code is not present in the last sector of the VOBU, reading, from the flash memory, the recording information for the information data in the MNFI_DI of the RDI pack, calculating an LBN for the next VOBU, and repeating an operation beginning with the reading of a first sector of the next VOBU from the optical disk;

creating RTR_VMGI when RDI is not present in the first sector of the VOBU, or when a sequence code is present in the last sector of the VOBU;

when the supply of power has been recovered, comparing the number of recorded titles, for recorded information related to information data that are stored in the flash memory, with the number of titles for information data, and determining whether, for information data, a next title is recorded on the optical disk;

when there is a next title for the information data recorded on the optical disk, repeating an operation beginning with the reproduction of the LBN at the head of the next title for the information data;

when a next title for information data is not present, writing, to the optical disk, RTR_VMGI that is created.

* * * * *